(12) United States Patent
Kuo (10) Patent No.: US 8,905,745 B2
(45) Date of Patent: Dec. 9, 2014

(54) OPTICAL COUPLING LENS MOLD CORE

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 60 days.

(21) Appl. No.: 13/858,050

(22) Filed: Apr. 7, 2013

(65) Prior Publication Data

US 2014/0134288 A1     May 15, 2014

(30) Foreign Application Priority Data

Nov. 9, 2012  (TW) .............................. 101141866 A (51) Int. Cl.
*B29C 45/17* (2006.01)
*B29C 45/26* (2006.01)

(52) U.S. Cl.
CPC .............. *B29C 45/26* (2013.01); *Y10S 425/808* (2013.01)
USPC ............................ 425/190; 425/577; 425/808

(58) Field of Classification Search
USPC .......................... 425/182, 185, 190, 577, 808
See application file for complete search history.

(56) References Cited

U.S. PATENT DOCUMENTS

| | | | | |
|---|---|---|---|---|
| 6,830,711 | B2 * | 12/2004 | Mills et al. ..................... | 425/808 |
| 7,731,874 | B2 * | 6/2010 | Saeki et al. .................... | 425/808 |
| 8,221,114 | B2 * | 7/2012 | Yen ................................ | 425/577 |
| 8,221,659 | B2 * | 7/2012 | Beebe et al. ................... | 425/808 |
| 8,235,700 | B2 * | 8/2012 | Lin ................................ | 425/577 |
| 8,246,335 | B2 * | 8/2012 | Lin ................................ | 425/808 |
| 8,262,380 | B2 * | 9/2012 | Yu et al. ........................ | 425/808 |
| 8,449,282 | B2 * | 5/2013 | Lin ................................ | 425/577 |
| 8,454,341 | B2 * | 6/2013 | Wu ................................ | 425/577 |
| 8,459,979 | B2 * | 6/2013 | Wu ................................ | 425/588 |
| 8,545,204 | B2 * | 10/2013 | Lin ................................ | 425/123 |

* cited by examiner

*Primary Examiner* — Tim Heitbrink
(74) *Attorney, Agent, or Firm* — Novak Druce Connolly Bove + Quigg LLP (57) ABSTRACT

A mold core includes first and second main bodies and an adjustment assembly. The first main body includes a front surface, a rear surface opposite to the front surface, and a receiving cavity passing through the front and rear surfaces. The front surface defines two first cavities at opposite sides of the receiving cavity. A connection line of centers of the first cavities intersects with a symmetry axis of the first cavities to form a first intersection point. The second main body includes a forming surface defining second cavities. A connection line of centers of the molding cavities intersects with a symmetry axis of the second cavities to form a second intersection point. The forming surface is coplanar with the front surface. The adjustment assembly abuts the first and the second main bodies to compensate an offset between the first and second intersection points to satisfy a predetermined range.

9 Claims, 9 Drawing Sheets

OPTICAL COUPLING LENS MOLD CORE

BACKGROUND

1. Technical Field

The present disclosure relates to molding technologies and, particularly, to an optical coupling lens mold core for molding optical coupling lenses.

2. Description of Related Art

An optical coupling lens is typically formed using an injection-molding mold. The optical coupling lens includes an optical surface, two posts perpendicularly extending from the optical surface, and a number of converging lenses formed on the optical surface. The converging lenses are arranged in a line between the two posts and are divided into "in" and "out" groups for transmitting optical signal in two opposite directions; the "in" group is symmetrical with the "out" group. A first connection line of centers of the posts is parallel to a second connection line of centers of the converging lenses. The first connection line intersects with a symmetry axis of the posts to form a first intersection point, and the second connection line intersects with a symmetry axis of the two group lenses to form a second intersection point.

In order to increase transmission accuracy and transmission efficiency of the optical signal, an offset between the first intersection point and the second intersection point must satisfy a predetermined range. Therefore it is important to design an optical coupling lens mold core for molding an optical coupling lens, of which satisfy the predetermined range.

DETAILED DESCRIPTION

Figure 1:
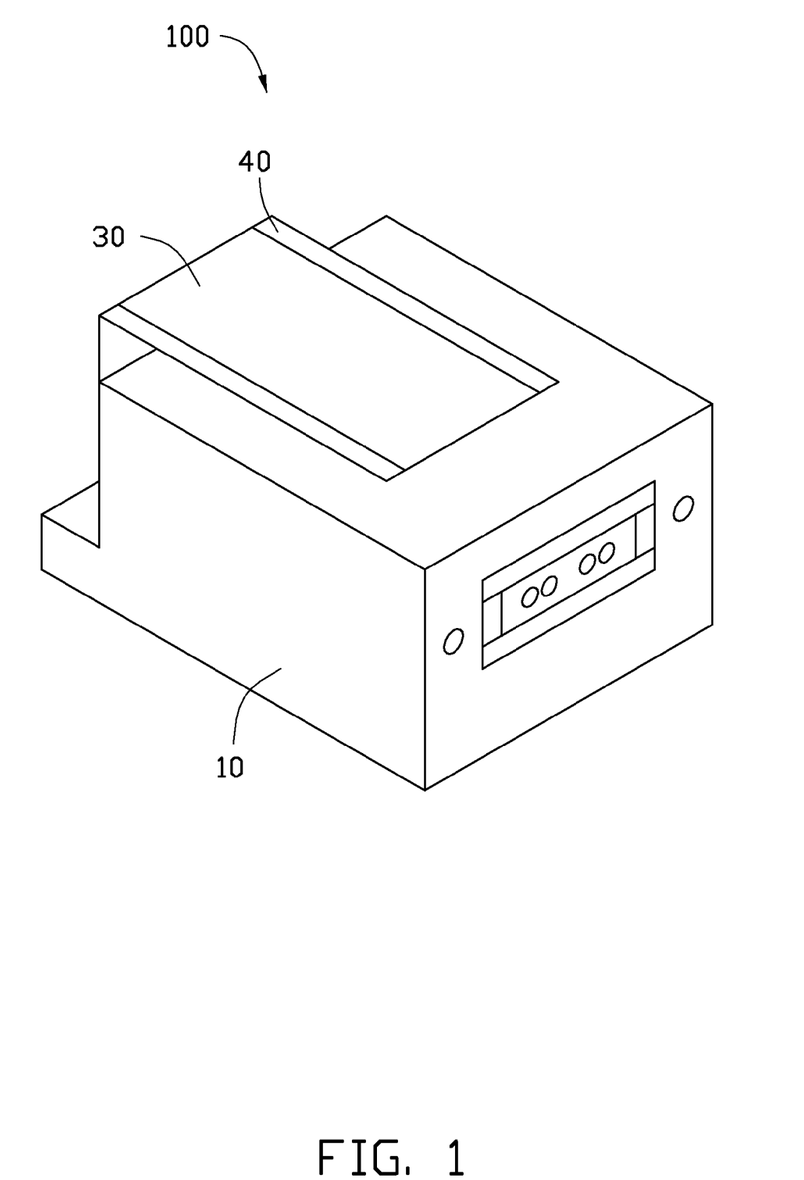
FIG. 1 is a schematic, isometric view of an optical coupling lens mold core, according to a first exemplary embodiment.

FIG. 1 is an optical coupling lens mold core 100, according to a first exemplary embodiment. The optical coupling lens mold core 100 includes a first main body 10, a second main body 30, and an adjustment assembly 40. The optical coupling lens mold core 100 is configured to form an optical coupling lens (not shown), and the optical coupling lens includes a couple surface, two posts, and a number of converging lenses.

Figure 2:
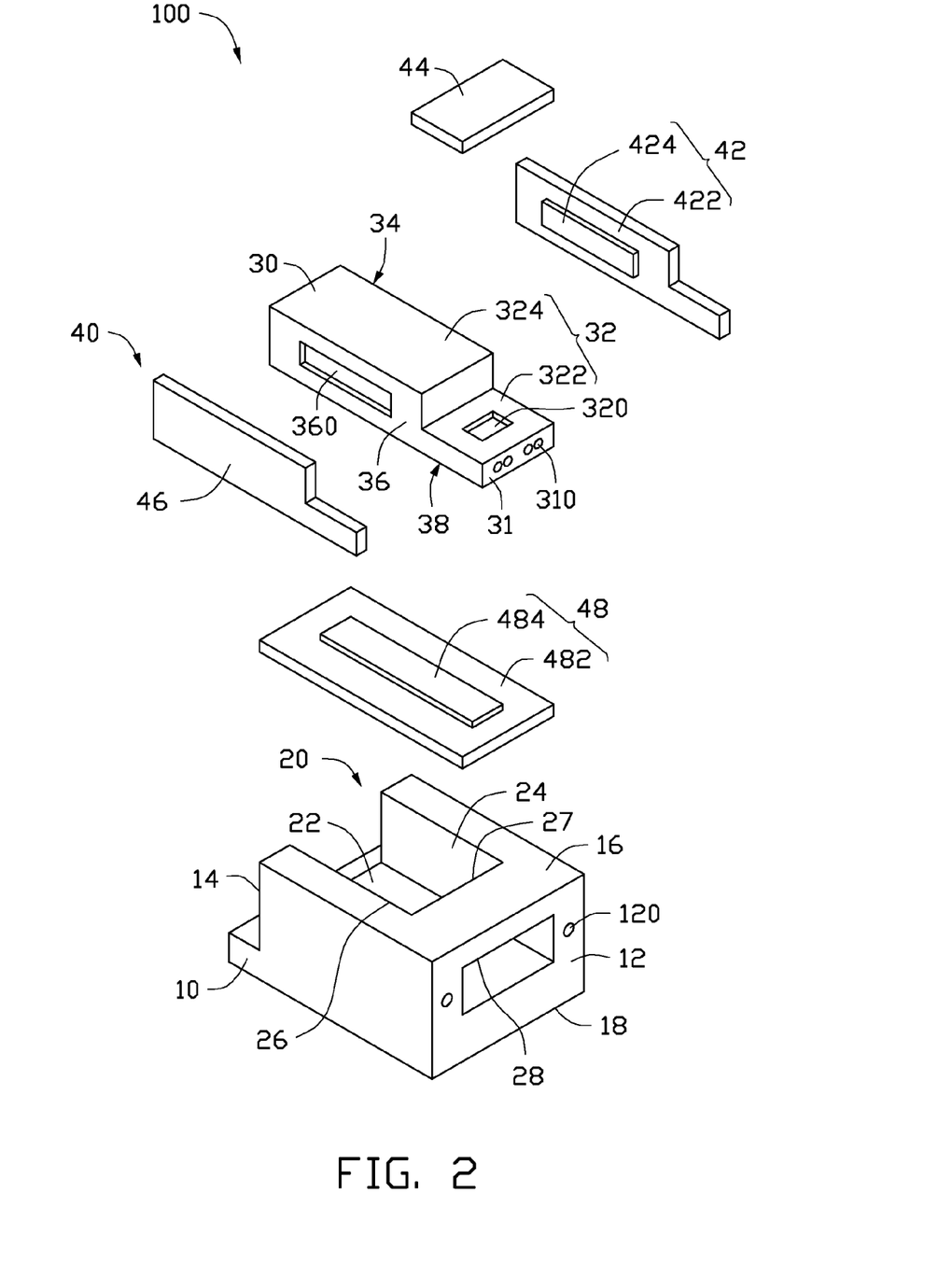
FIG. 2 is an exploded view of the optical coupling lens mold core of FIG. 1.
Figure 3:
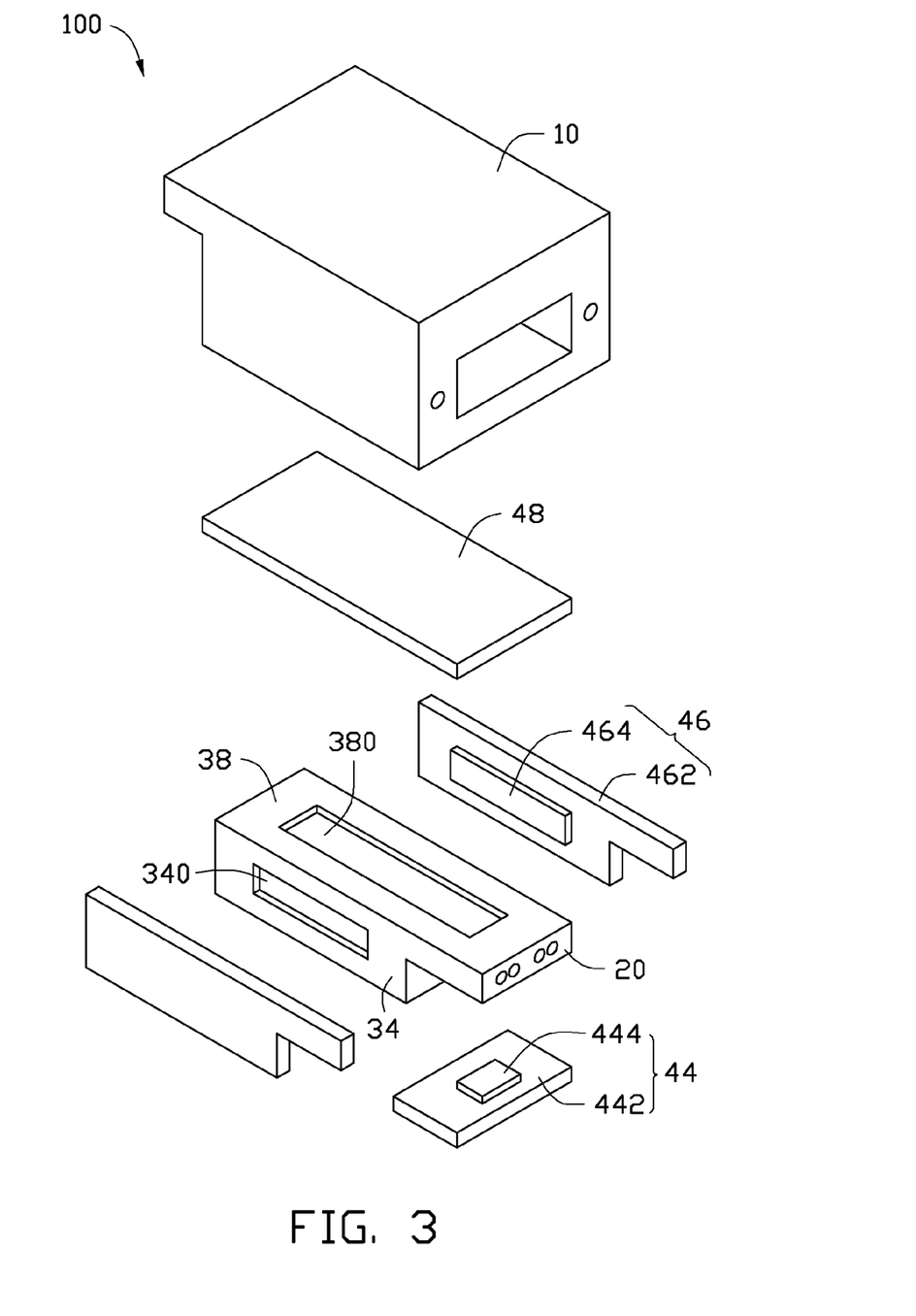
FIG. 3 is similar to FIG. 2, viewed from another aspect.

Referring to FIGS. 2-3, the first main body 10 is substantially a cuboid and includes a front surface 12, a rear surface 14, an upper surface 16, and a lower surface 18. The front surface 12 and the rear surface 14 are positioned at opposite sides of the first main body 10, and the front surface 12 is parallel to the rear surface 14. The upper surface 16 and the lower surface 18 are positioned at opposite sides of the first main body 10, and the upper surface 16 is parallel to the lower surface 18. The upper surface 16 is perpendicularly interconnected between the front surface 12 and the rear surface 14. The lower surface 18 perpendicularly extends from the front surface 12 toward the rear surface 14. Two first molding cavities 120 are defined in the front surface 12 for forming two posts (not shown). A connection line of centers of the two first molding cavities 120 intersects with a symmetry axis of the two first molding cavities 120 to form a first intersection point.

The first main body 10 defines a receiving cavity 20. The receiving cavity 20 passes through the front surface 12 and the rear surface 14 and is arranged between the two first molding cavities 120. The first main body 10 includes a bottom surface 22, a first inner side surface 24, a second inner side surface 26, a third inner side surface 27, and a top surface 28 in the receiving cavity 20. The bottom surface 22 is parallel to the upper surface 16 and is recessed relative to the upper surface 16. The first inner side surface 24 and the second inner side surface 26 perpendicularly extend from the bottom surface 22 and are parallel to each other. The third inner side surface 27 is spaced apart from the bottom surface 22 and perpendicularly interconnected between the first inner side surface 24 and the second inner side surface 26. The top surface 28 is arranged between the upper surface 16 and the bottom surface 22 and is interconnected between the third inner side surface 27 and the front surface 12. In other words, the top surface 28 is spaced apart from the upper surface 16 and the bottom surface 22. The top surface 28 is perpendicularly interconnected between the first inner side surface 24 and the second inner side surface 26.

The second main body 30 includes a forming surface 31, an upper outer surface 32, a first outer side surface 34, a second outer side surface 36, and a lower outer surface 38. The upper outer surface 32 is a step surface and includes a first portion 322 and a second portion 324. The first portion 322 is lower than the second portion 324 and parallel to the second portion 324. The lower outer surface 38 and the upper outer surface 32 are positioned at opposite sides of the second main body 30, and the lower outer surface 38 is parallel to the first portion 322 and the second portion 324. The first outer side surface 34 and the second outer side surface 36 are positioned at opposite sides of the second main body 30 and perpendicularly interconnected between the upper outer surface 32 and the lower outer surface 38. The forming surface 31 perpendicularly connects the first portion 322, the first outer side surface 34, the second outer side surface 36, and the lower outer surface 38.

Two groups of second molding cavities 310 are defined in the forming surface 31 for forming two groups of converging lenses (not shown). A connection line of centers of the second molding cavities 310 intersects with a symmetry axis of the two groups of second molding cavities 310 to form a second intersection point. The first portion 322 defines an upper recess 320. The first outer side surface 34 defines a first side recess 340. The second outer side surface 36 defines a second side recess 360. The lower outer surface 38 defines a lower recess 380. In this embodiment, the upper recess 320, the first side recess 340, the second side recess 360, and the lower recess 380 are rectangular.

The adjustment assembly 40 includes a first adjustment member 42, a second adjustment member 44, a third adjustment member 46, and a fourth adjustment member 48. The first adjustment member 42 includes a first adjustment portion 422 and a first engagement portion 424 corresponding to the first side recess 340. The adjustment portion 422 is a planar plate, and the first engagement portion 424 perpendicularly extends from the first adjustment portion 422. The second adjustment member 44 includes a second adjustment portion 442 and a second engagement portion 444 corresponding to the upper recess 320. The second adjustment portion 442 is substantially a rectangular planar plate, and the second engagement portion 444 perpendicularly extends from the second adjustment portion 442. The third adjustment member 46 includes a third adjustment portion 462 and a third engagement portion 464 corresponding to the second side recess 360. The third adjustment portion 462 is a planar plate, and the third engagement portion 464 perpendicularly extends from the third adjustment portion 462. The fourth adjustment member 48 includes a fourth adjustment portion 482 and a fourth engagement portion 484 corresponding to the lower recess 380. The fourth adjustment portion 482 is substantially a rectangular planar plate, and the fourth engagement portion 484 perpendicularly extends from the fourth adjustment portion 482. In this embodiment, the first engagement portion 424, the second engagement portion 444, the third engagement portion 464, and the fourth engagement portion 484 are rectangular corresponding to the first side recess 340, the upper recess 320, the second side recess 360, and the lower recess 380.

When in assembly, the first engagement portion 424 engages in the first side recess 340, and the first adjustment portion 422 contacts the first outer side surface 34, thereby the first adjustment member 42 is mounted on the first outer side surface 34. The second engagement portion 444 engages in the upper recess 320, and the first adjustment portion 422 contacts the first portion 322, thereby the second adjustment member 44 is mounted on the first portion 322. The third engagement portion 464 engages in the second side recess 360, and the third adjustment portion 462 contacts the second outer side surface 36, thereby the third adjustment member 46 is mounted on the second outer side surface 36. The fourth engagement portion 484 engages in the lower recess 380, and the fourth adjustment portion 482 contacts the lower outer surface 38, thereby the fourth adjustment member 48 is mounted on the lower outer surface 38. The main body 30 together with the four adjustment members 42, 44, 46, and 48 is received in the receiving cavity 20. In detail, the first adjustment portion 422 contacts the first inner side surface 24, the second adjustment portion 442 contacts the top surface 28, the third adjustment portion 462 contacts the second inner side surface 26, the fourth adjustment portion 482 contacts the bottom surface 22, and the forming surface 31 is coplanar with the front surface 12. In this situation, the four adjustment members 42, 44, 46, and 48 are cooperatively applied to avoid or reduce an offset between the first intersection point of the optical coupling lens mold core 100 and the second intersection point of the optical coupling lens mold core 100 to a predetermined range. Accordingly, an offset between a first intersection point and a second intersection point of an optical coupling lens molded by the optical coupling lens mold core 100 can satisfy the predetermined range. Therefore, the transmission accuracy and the transmission efficiency of optical signal of the optical coupling lens can be increased.

Figure 4:
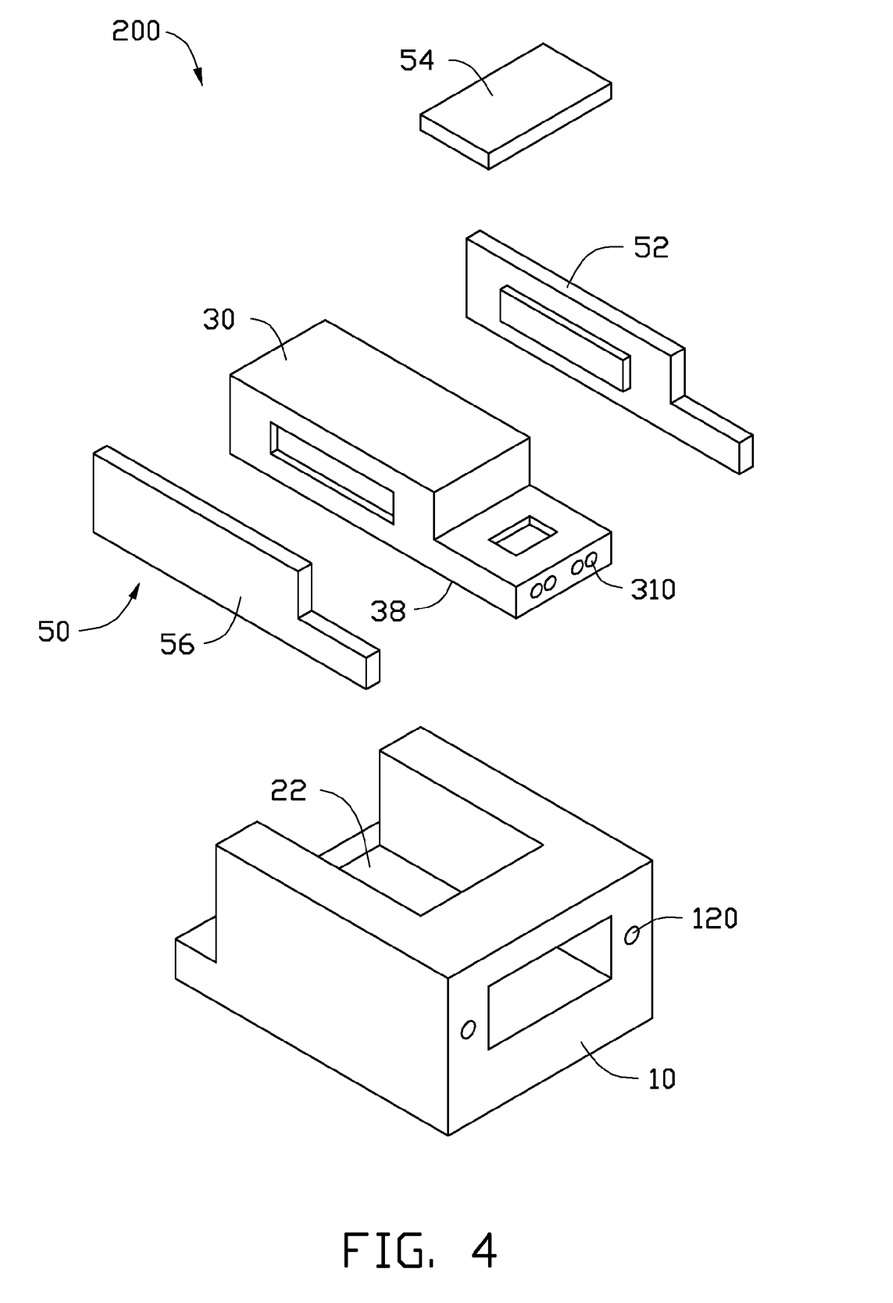
FIG. 4 is an exploded view of an optical coupling lens mold core, according to a second exemplary embodiment.

FIG. 4 is an optical coupling lens mold core 200, according to a second exemplary embodiment. The differences between the optical coupling lens mold core 200 and the optical coupling lens mold core 100 are that the fourth adjustment member 48 is omitted. The adjustment assembly 50 consists of a first adjustment member 52, a second adjustment member 54, and a third adjustment member 56. The structures and locations of the first adjustment member 52, of the second adjustment member 54, and of the third adjustment member 56 are substantially the same as the structures and locations of the first adjustment member 42, of the second adjustment member 44, and of the third adjustment member 46 in the first embodiment, respectively. The lower outer surface 38 directly contacts the bottom surface 22. In the optical coupling lens mold core 200, the three adjustment members 52, 54, and 56 are cooperatively applied to avoid or reduce an offset between the first intersection point of the optical coupling lens mold core 200 and the second intersection point of the optical coupling lens mold core 200 to a predetermined range. Accordingly, an offset between a first intersection point and a second intersection point of an optical coupling lens molded by the optical coupling lens mold core 200 can satisfy the predetermined range. Therefore, the transmission accuracy and the transmission efficiency of optical signal of the optical coupling lens can be increased.

Figure 5:
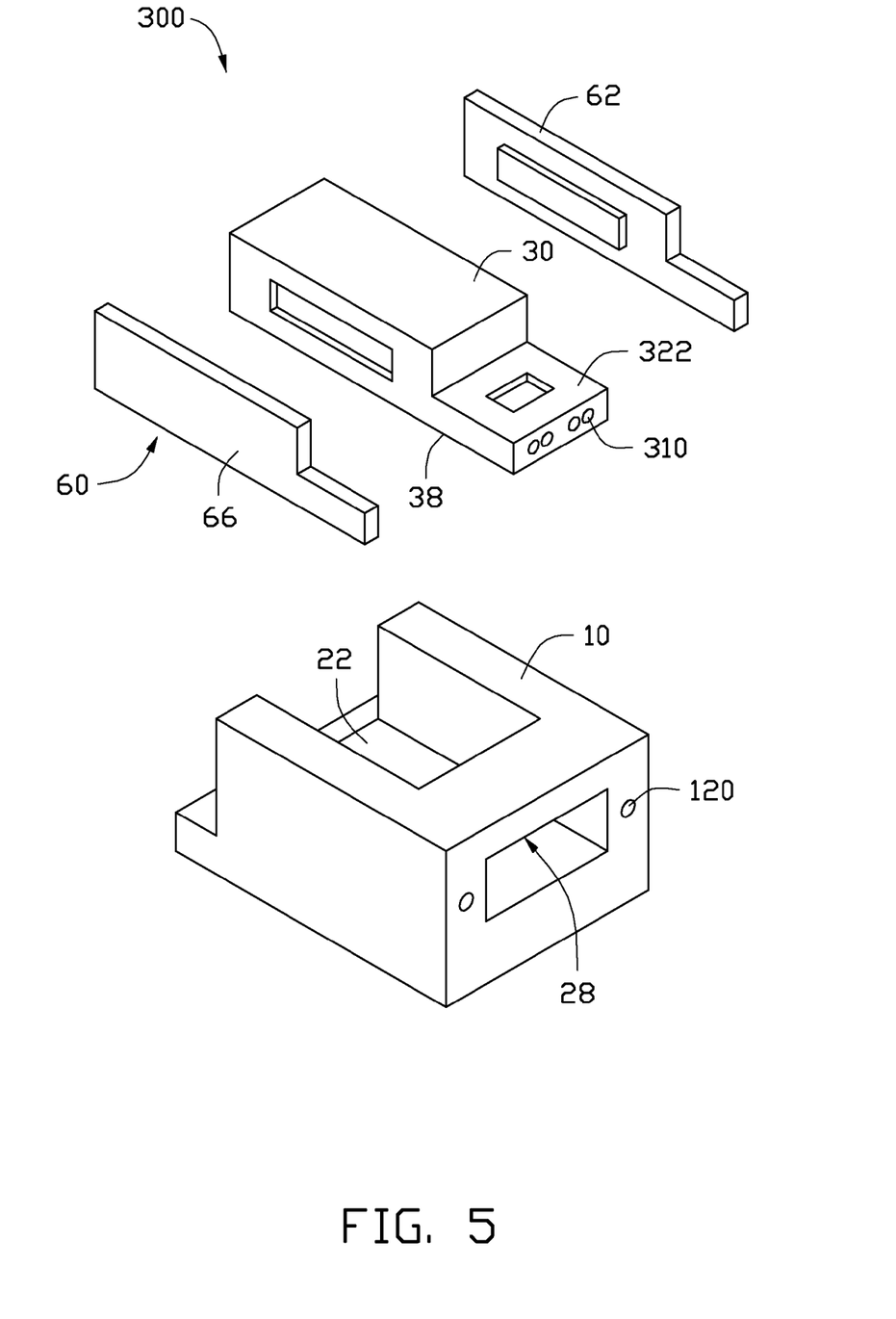
FIG. 5 is an exploded view of an optical coupling lens mold core, according to a third exemplary embodiment.

FIG. 5 is an optical coupling lens mold core 300, according to a third exemplary embodiment. The differences between the optical coupling lens mold core 300 and the optical coupling lens mold core 100 are that the second adjustment member 44 and the fourth adjustment member 48 are omitted. The adjustment assembly 60 consists of a first adjustment member 62 and a second adjustment member 64. The structures and locations of the first adjustment member 62 and of the second adjustment member 66 are substantially the same as the structures and locations of the first adjustment member 42 and of the third adjustment member 46 in the first embodiment, respectively. The lower outer surface 38 directly contacts the bottom surface 22, and the first portion 322 directly contacts the top surface 28. In the optical coupling lens mold core 300, the two adjustment members 62 and 66 are cooperatively applied to avoid or reduce an offset between the first intersection point of the optical coupling lens mold core 300 and the second intersection point of the optical coupling lens mold core 300 to a predetermined range. Accordingly, an offset between a first intersection point and a second intersection point of an optical coupling lens molded by the optical coupling lens mold core 300 can satisfy the predetermined range. Therefore, the transmission accuracy and the transmission efficiency of optical signal of the optical coupling lens can be increased.

Figure 6:
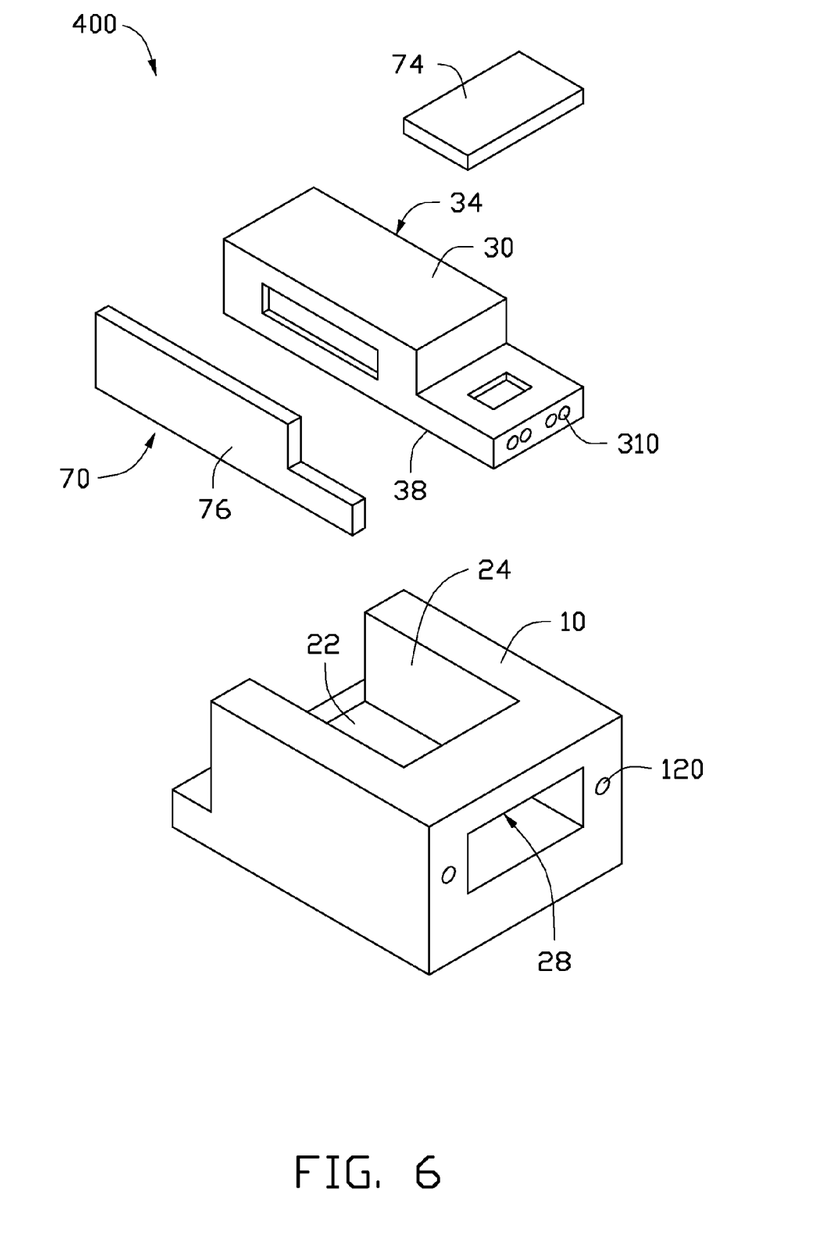
FIG. 6 is an exploded view of an optical coupling lens mold core, according to a fourth exemplary embodiment.

FIG. 6 is an optical coupling lens mold core 400, according to a fourth exemplary embodiment. The differences between the optical coupling lens mold core 400 and the optical coupling lens mold core 100 are that the first adjustment member 42 and the fourth adjustment member 48 are omitted. The adjustment assembly 70 consists of a first adjustment member 74 and a second adjustment member 76. The structures and locations of the first adjustment member 74 and of the second adjustment member 76 are substantially the same as the structures and locations of the second adjustment member 44 and of the third adjustment member 46 in the first embodiment, respectively. The lower outer surface 38 directly contacts the bottom surface 22, and the first outer side surface 34 directly contacts the first inner side surface 24. In the optical coupling lens mold core 400, the two adjustment members 74 and 76 are cooperatively applied to avoid or reduce an offset between the first intersection point of the optical coupling lens mold core 400 and the second intersection point of the optical coupling lens mold core 400 to a predetermined range. Accordingly, an offset between a first intersection point and a second intersection point of an optical coupling lens molded by the optical coupling lens mold core 400 can satisfy the predetermined range. Therefore, the transmission accuracy and the transmission efficiency of optical signal of the optical coupling lens can be increased.

Figure 7:
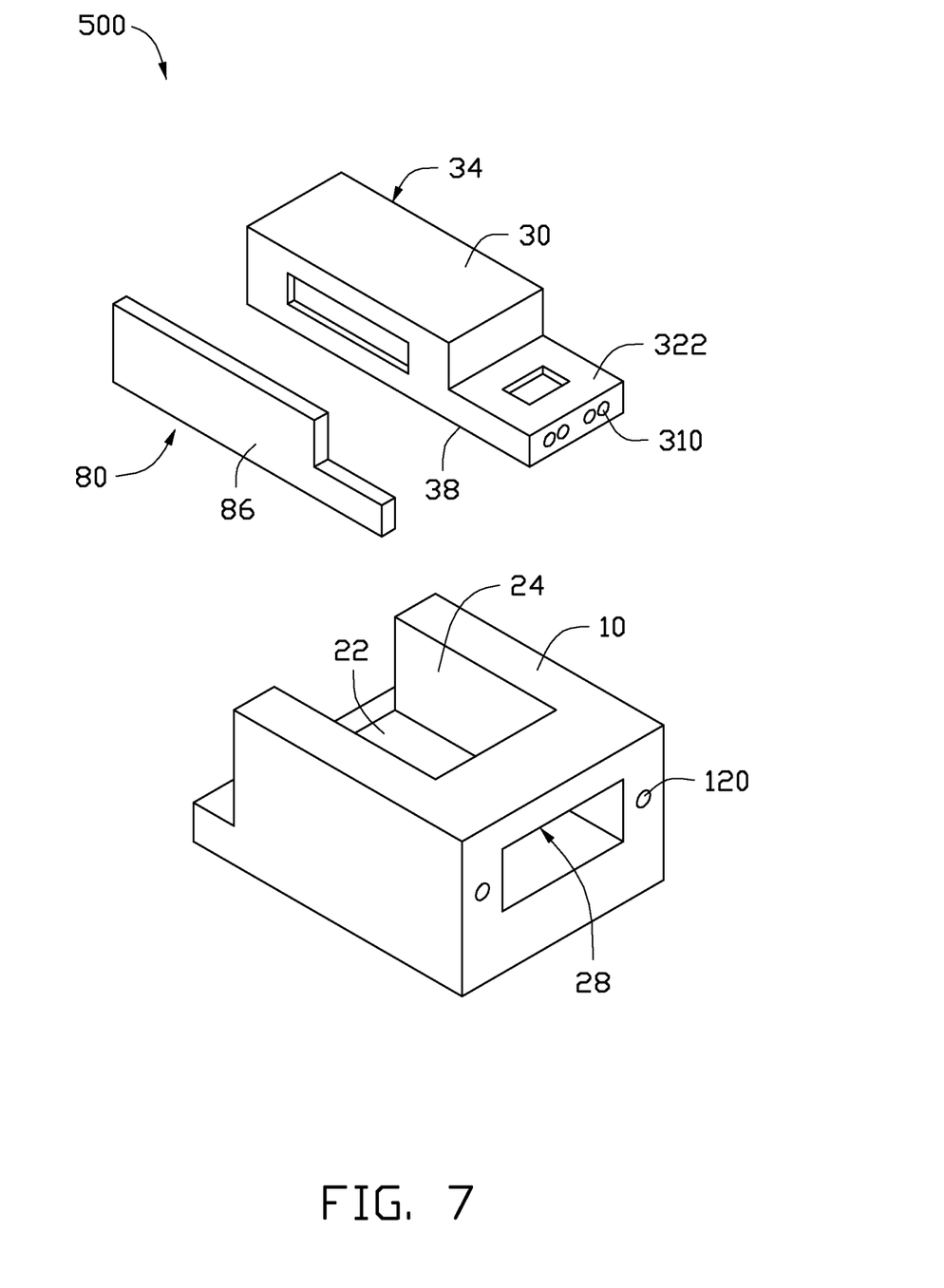
FIG. 7 is an exploded view of an optical coupling lens mold core, according to a fifth exemplary embodiment.

FIG. 7 is an optical coupling lens mold core 500, according to a fifth exemplary embodiment. The differences between the optical coupling lens mold core 500 and the optical coupling lens mold core 100 are that the first adjustment member 42, the second adjustment member 44, and the fourth adjustment member 48 are omitted. The adjustment assembly 80 consists of a first adjustment member 86. The structure and location of the first adjustment member 86 are substantially the same as the structure and location of the third adjustment member 46 in the first embodiment. The lower outer surface 38 directly contacts the bottom surface 22, the first outer side surface 34 directly contacts the first inner side surface 24, and the first portion 322 directly contacts the top surface 28. In the optical coupling lens mold core 500, the first adjustment member 86 is applied to avoid or reduce an offset between the first intersection point of the optical coupling lens mold core 500 and the second intersection point of the optical coupling lens mold core 500 to a predetermined range. Accordingly, an offset between a first intersection point and a second intersection point of an optical coupling lens molded by the optical coupling lens mold core 500 can satisfy the predetermined range. Therefore, the transmission accuracy and the transmission efficiency of optical signal of the optical coupling lens can be increased.

Figure 8:
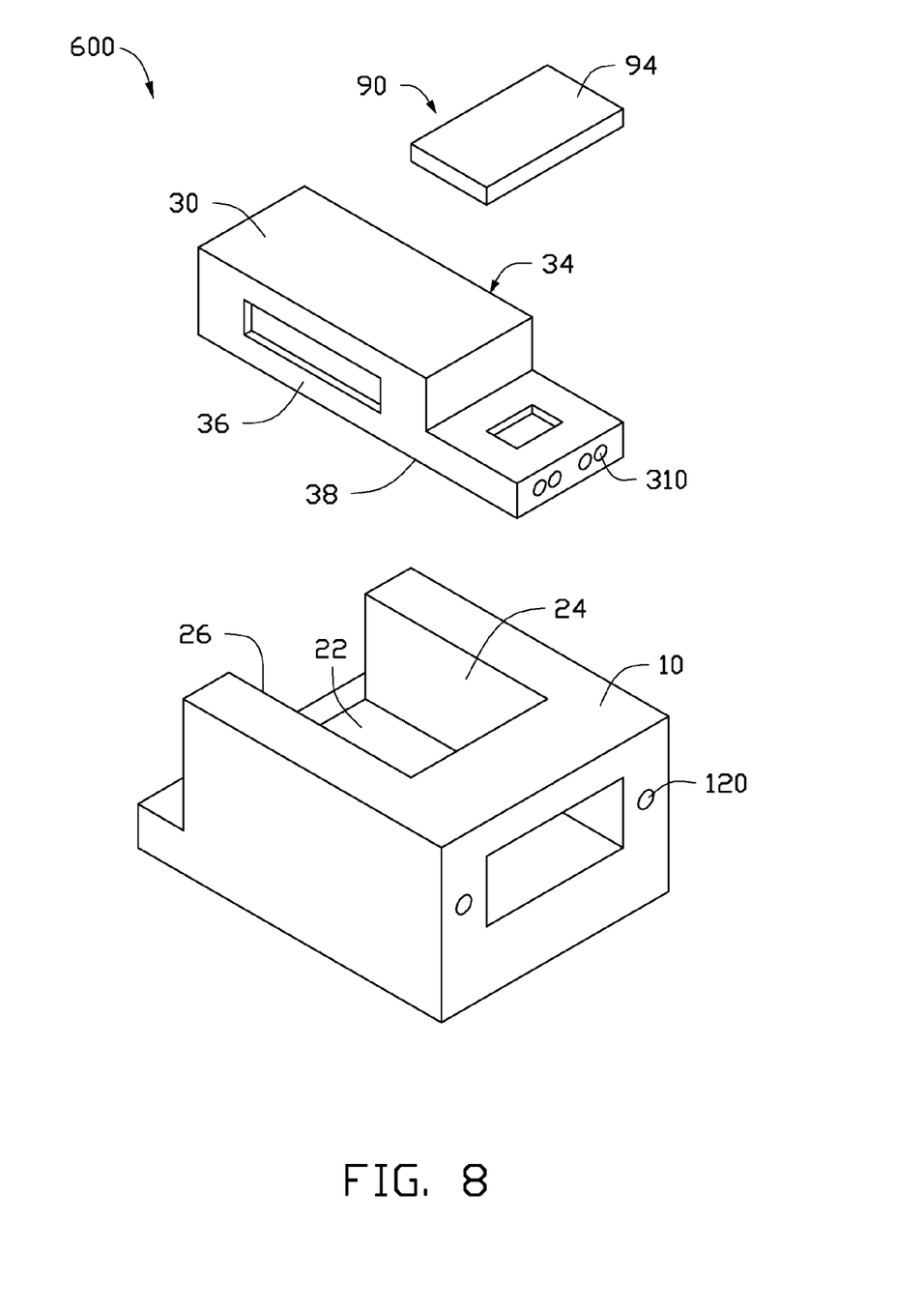
FIG. 8 is an exploded view of an optical coupling lens mold core, according to a sixth exemplary embodiment.

FIG. 8 is an optical coupling lens mold core 600, according to a sixth exemplary embodiment. The differences between the optical coupling lens mold core 600 and the optical coupling lens mold core 100 are that the first adjustment member 42, the third adjustment member 46, and the fourth adjustment member 48 are omitted. The adjustment assembly 90 consists of a first adjustment member 94. The structure and location of the first adjustment member 94 are substantially the same as the structure and location of the second adjustment member 44 in the first embodiment. The lower outer surface 38 directly contacts the bottom surface 22, the first outer side surface 34 directly contacts the first inner side surface 24, and the second outer side surface 36 directly contacts the second inner side surface 26. In the optical coupling lens mold core 600, the first adjustment member 94 is applied to avoid or reduce an offset between the first intersection point of the optical coupling lens mold core 600 and the second intersection point of the optical coupling lens mold core 600 to a predetermined range. Accordingly, an offset between a first intersection point and a second intersection point of an optical coupling lens molded by the optical coupling lens mold core 600 can satisfy the predetermined range. Therefore, the transmission accuracy and the transmission efficiency of optical signal of the optical coupling lens can be increased.

Figure 9:
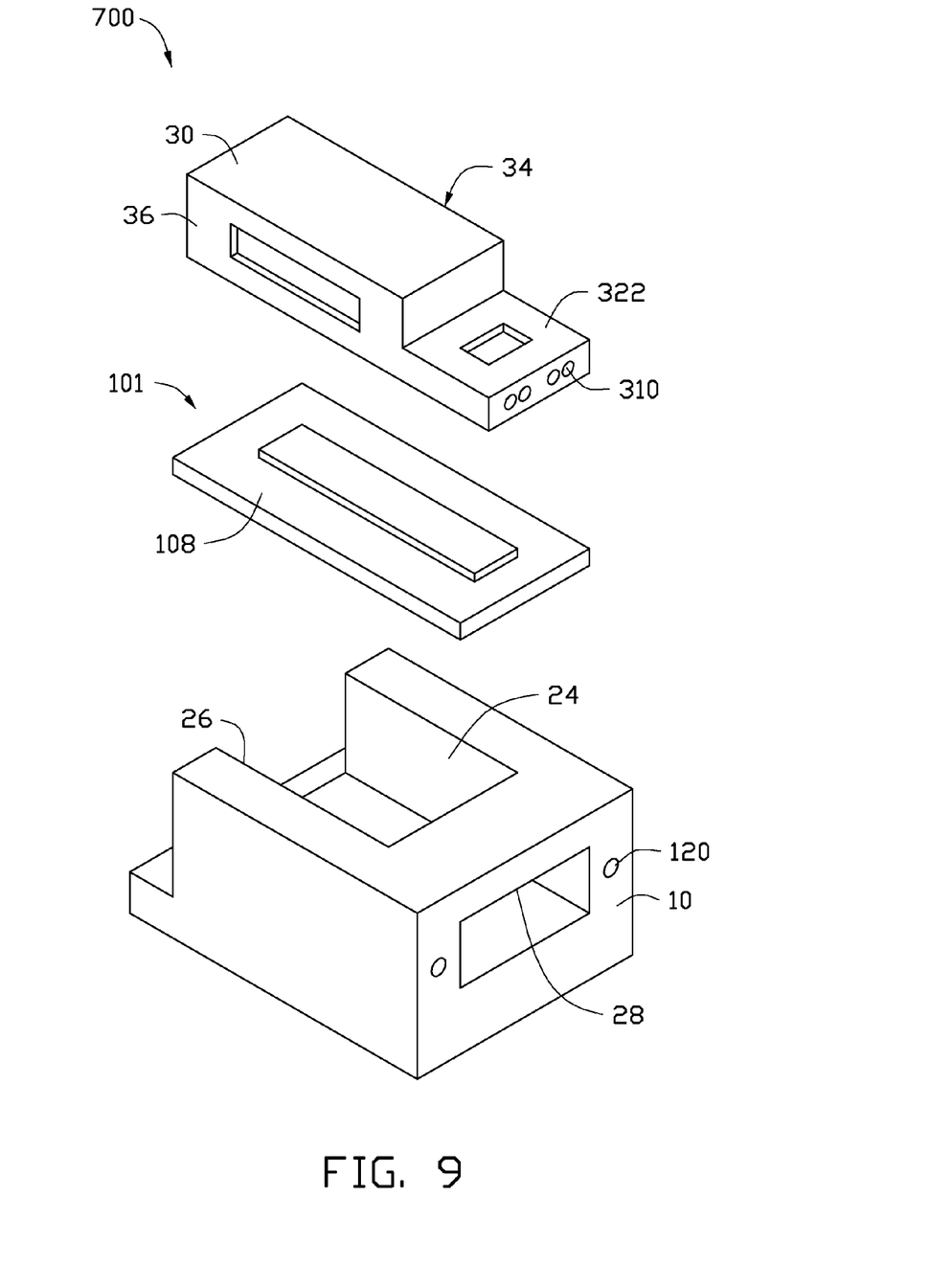
FIG. 9 is an exploded view of an optical coupling lens mold core, according to a seventh exemplary embodiment.

FIG. 9 is an optical coupling lens mold core 700, according to a seventh exemplary embodiment. The differences between the optical coupling lens mold core 700 and the optical coupling lens mold core 100 are that the first adjustment member 42, the second adjustment member 44, and the third adjustment member 46 are omitted. The adjustment assembly 101 consists of a first adjustment member 108. The structure and location of the first adjustment member 108 are substantially the same as the structure and location of the fourth adjustment member 48 in the first embodiment. The first outer side surface 34 directly contacts the first inner side surface 24, the second outer side surface 36 directly contacts the second inner side surface 26, and the first portion 322 directly contacts the top surface 28. In the optical coupling lens mold core 700, the first adjustment member 108 is applied to avoid or reduce an offset between the first intersection point of the optical coupling lens mold core 700 and the second intersection point of the optical coupling lens mold core 700 to a predetermined range. Accordingly, an offset between a first intersection point and a second intersection point of an optical coupling lens molded by the optical coupling lens mold core 700 can satisfy the predetermined range. Therefore, the transmission accuracy and the transmission efficiency of optical signal of the optical coupling lens can be increased.

Even though numerous characteristics and advantages of the present embodiments have been set fourth in the foregoing description, together with details of the structures and functions of the embodiments, the disclosure is illustrative only, and changes may be made in details, especially in matters of shape, size, and the arrangement of parts within the principles of the disclosure to the full extent indicated by the broad general meaning of the terms in which the appended claims are expressed.

What is claimed is:

1. An optical coupling lens mold core comprising:
   a first main body comprising a front surface, a rear surface opposite to the front surface, and a receiving cavity passing through the front surface and the rear surface, the front surface being parallel to the rear surface and defining two first molding cavities for forming posts of an optical coupling lens, the receiving cavity located between the first molding cavities, a connection line of centers of the first molding cavities intersecting with a symmetry axis of the first molding cavities to form a first intersection point;
   a second main body comprising a forming surface, the forming surface defining two groups of second molding cavities for forming converging lenses, a connection line of centers of the second molding cavities intersecting with a symmetry axis of the two groups of second molding cavities to form a second intersection point, the second main body received in the receiving cavity, and the forming surface being coplanar with the front surface; and
   an adjustment assembly received in the receiving cavity and tightly abutting against the first main body and the second main body, and configured for avoiding or reducing an offset between the first intersection point and the second intersection point to a predetermined range.

2. The optical coupling lens mold core as claimed in claim 1, wherein the first main body comprises a bottom surface, a first inner side surface, a second inner side surface, a third inner side surface, and a top surface, the bottom surface is parallel to the upper surface and is recessed relative to the upper surface, the first inner side surface and the second inner side surface perpendicularly extend from the bottom surface and are parallel to each other, the third inner side surface is spaced apart from the bottom surface and perpendicularly interconnected between the first inner side surface and the second inner side surface, and the top surface is arranged between the upper surface and the bottom surface and interconnected between the third inner side surface and the front surface.

3. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the lower outer surface, the first adjustment member contacts the bottom surface and the lower outer surface, the first outer side surface contacts the first inner side surface, the second outer side surface contacts the second inner side surface, and the first portion contacts the top surface.

4. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the first portion, the first adjustment member contacts the first portion and the top surface, the first outer side surface contacts the first inner side surface, the second outer side surface contacts the second inner side surface, and the lower outer surface contacts the bottom surface.

5. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the second outer side surface, the first adjustment member contacts the second outer side surface and the second inner side surface, the first outer side surface contacts the first inner side surface, the lower outer surface contacts the bottom surface, and the first portion contacts the top surface.

6. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the first portion and a second adjustment member mounted on the second outer side surface, the first adjustment member contacts the first portion and the top surface, the first outer side surface contacts the first inner side surface, the lower outer surface contacts the bottom surface, and the second adjustment member contacts the second outer side surface and the second inner side surface.

7. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the first outer side surface and a second adjustment member mounted on the second outer side surface, the first adjustment member contacts the first outer side surface and the first inner side surface, the first portion contacts the top surface, the second adjustment member contacts the second outer side surface and the second inner side surface, and the lower outer surface contacts the bottom surface.

8. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the first outer side surface, a second adjustment member mounted on the first portion, and a third adjustment member mounted on the second outer side surface, the first adjustment member contacts the first outer side surface and the first inner side surface, the second adjustment member contacts the top surface and the first portion, the third adjustment member contacts the second outer side surface and the second inner side surface, and the lower outer surface contacts the bottom surface.

9. The optical coupling lens mold core as claimed in claim 2, wherein the second main body comprises an upper outer surface, a first outer side surface, a second outer side surface opposite to the first outer side surface, and a lower outer surface opposite to the upper outer surface, the upper outer surface, the first outer side surface, the second outer side surface, and the lower outer surface perpendicularly connect the forming surface and are connected each other end-to-end, the upper outer surface is a step surface and comprises a first portion parallel to the lower outer surface and a second portion parallel to the first portion, the adjustment assembly comprises a first adjustment member mounted on the first outer side surface, a second adjustment member mounted on the first portion, a third adjustment member mounted on the second outer side surface, and a fourth adjustment member mounted on the lower outer surface, the first adjustment member contacts the first outer side surface and the first inner side surface, the second adjustment member contacts the top surface and the first portion, the third adjustment member contacts the second outer side surface and the second inner side surface, and the fourth adjustment member contacts the lower outer surface and the bottom surface.

* * * * *